US010488588B1

(12) United States Patent
Seyedi

(10) Patent No.: US 10,488,588 B1
(45) Date of Patent: Nov. 26, 2019

(54) PHOTONIC INTEGRATED CIRCUIT USING A QUANTUM DOT COMB LASER FOR HETERODYNE OPTICAL SIGNALS

(71) Applicant: HEWLETT PACKARD ENTERPRISE DEVELOPMENT LP, Houston, TX (US)

(72) Inventor: Ashkan Seyedi, Palo Alto, CA (US)

(73) Assignee: Hewlett Packard Eneterprise Development LP, Houston, TX (US)

( * ) Notice: Subject to any disclaimer, the term of this patent is extended or adjusted under 35 U.S.C. 154(b) by 0 days.

(21) Appl. No.: 16/193,925

(22) Filed: Nov. 16, 2018

(51) Int. Cl.
G02B 6/12 (2006.01)
H04B 10/25 (2013.01)
H04B 10/70 (2013.01)
G02B 6/293 (2006.01)

(52) U.S. Cl.
CPC ..... G02B 6/12004 (2013.01); G02B 6/12007 (2013.01); H04B 10/25 (2013.01); H04B 10/70 (2013.01); G02B 6/29338 (2013.01); G02B 6/29395 (2013.01); G02B 2006/12061 (2013.01); G02B 2006/12109 (2013.01); G02B 2006/12121 (2013.01); G02B 2006/12147 (2013.01)

(58) Field of Classification Search
CPC ............ G02B 6/12004; G02B 6/12007; G02B 6/29338; G02B 6/29395; G02B 2006/12061; G02B 2006/12109; G02B 2006/12147; G02B 2006/12121; H04B 10/70; H04B 10/25
See application file for complete search history.

(56) References Cited

U.S. PATENT DOCUMENTS 9,461,442 B2 10/2016 Shahine
9,748,738 B2 8/2017 Krishnamoorthy et al.
10,215,925 B1* 2/2019 Knights ............. G02B 6/12007
2019/0036304 A1* 1/2019 Lu ........................... H01S 5/142
2019/0036305 A1* 1/2019 Lu ........................... H01S 5/142

FOREIGN PATENT DOCUMENTS

WO WO-2014197780 A1 12/2014

OTHER PUBLICATIONS

Carpintero, G. et al.; "Photonic Integrated Circuits for Radio-Frequency Signal Generation"; Jan. 15, 2016; 8 pages.
Kanno, A. et al.; "Frequency-Locked Optical Two-Tone THz Signal Generation with Optical Frequency Comb and Injection-Locked Laser"; 2013; 2 pages.

(Continued)

Primary Examiner — Andrew Jordan
(74) Attorney, Agent, or Firm — Hewlett Packard Enterprise Patent Department

(57) ABSTRACT

A photonic integrated circuit (PIC) can include a quantum dot comb laser comprising a plurality of channels and a waveguide receiving laser output from the plurality of channels of the quantum dot comb laser. The PIC can further include a plurality of optical filters each coupled to the waveguide and outputting resonant optical output to a plurality of optical combiners. Each optical combiner couples the resonant optical output from a corresponding pair of optical filters to output a heterodyned optical signal.

20 Claims, 5 Drawing Sheets

(56) References Cited

OTHER PUBLICATIONS

Keyvaninia, S. et al.; "Narrow-linewidth short-pulse III-V-on-silicon mode-locked lasers based on a linear and ring cavity geometry"; Feb. 3, 2015; 9 pages.

Yu et al., "DWDM Optical Millimeter-Wave Generation for Radio-Over-Fiber Using an Optical Phase Modulator and an Optical Interleave", IEEE Photonics Technology Letters vol. 18, Issue 13, Jul. 2006, pp. 1418-1421.

Ogusu et al., "60 GHz Millimeter-Wave Source Using Two-Mode Injection-Locking of a FabryPerot Slave Laser", IEEE Microwave and Wireless Components Letters, vol. 11, Issue 3, 2001, pp. 101-104.

Lo et al., "Mode-locked laser with pulse interleavers in a monolithic photonic integrated circuit for millimeter wave and terahertz carrier generation", Optics Letters, vol. 42, Issue 8, 2017, pp. 1532-1536.

Carpintero et al., "Microwave Photonic Integrated Circuits for Millimeter-WaveWireless Communications", Journal of Lightwave Technology 32.20, 2014, pp. 3495-3502.

\* cited by examiner

PHOTONIC INTEGRATED CIRCUIT USING A QUANTUM DOT COMB LASER FOR HETERODYNE OPTICAL SIGNALS

BACKGROUND

A single radio-frequency (RF) tone may be generated using multiple separate lasers and high-speed circuitry (e.g., high-speed modulators). In order to achieve a desired RF tone, the use of separate lasers requires phase-locking, which can involve non-trivial laser tuning and/or additional circuitry that can increase costs significantly in addition to consuming high levels of power.

BRIEF DESCRIPTION OF THE DRAWINGS

The disclosure herein is illustrated by way of example, and not by way of limitation, in the figures of the accompanying drawings in which like reference numerals refer to similar elements, and in which.

Figure 1:
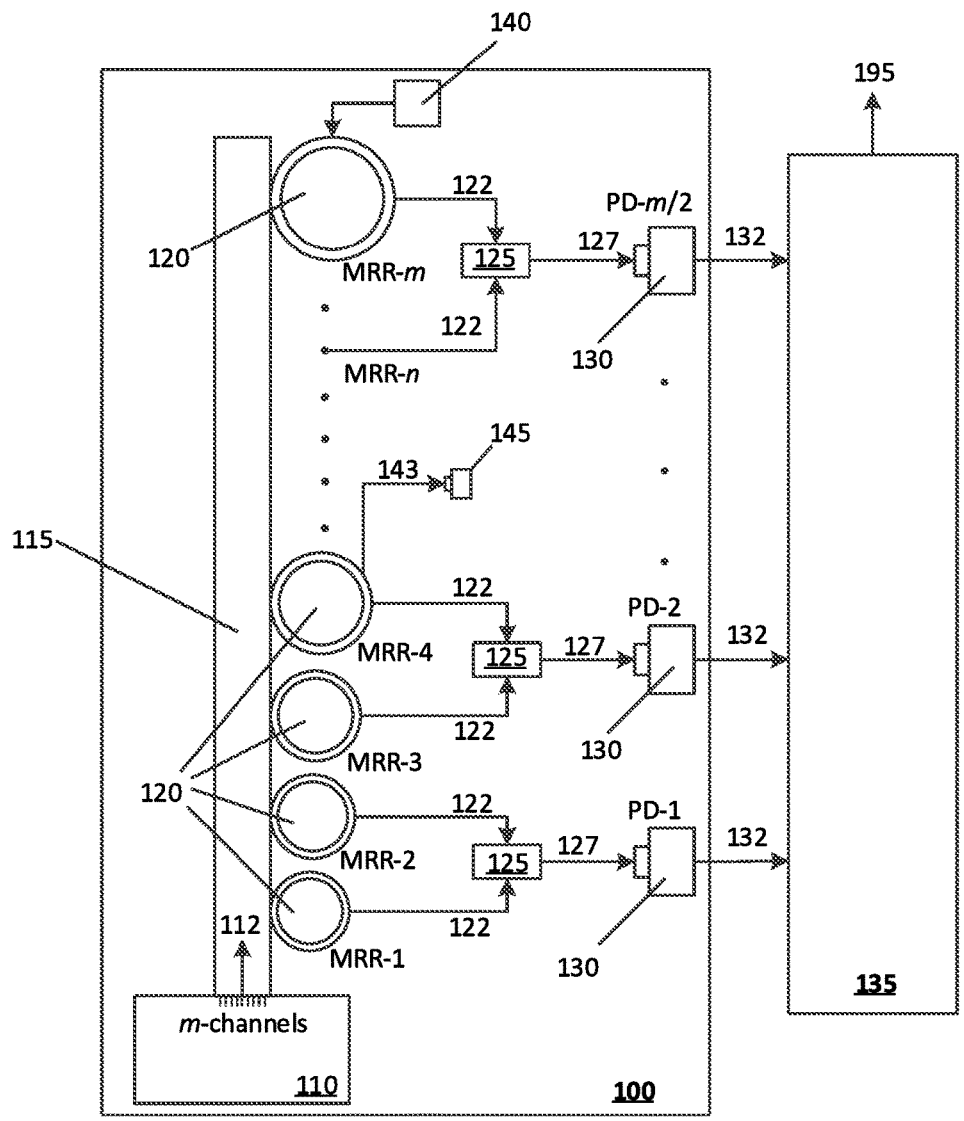
FIG. 1 illustrates an example photonic integrated circuit using a multi-channel quantum dot laser.

Throughout the drawings, identical reference numbers designate similar but not necessarily identical elements. The drawings are not necessarily to scale, and the size of some parts may be exaggerated to more clearly illustrate the examples shown. Moreover, the drawings provide examples and/or implementations consistent with the description. However, the description is not limited to the examples and/or implementations provided in the drawings.

DETAILED DESCRIPTION

A tuneable, multi-toned RF source is described herein. The RF source can include a photonic integrated circuit that includes a quantum dot comb laser having multiple output channels. Each output channel can correspond to a different color or wavelength of laser light, which can further correspond to a particular quantum dot particle size within the laser cavity of the quantum dot laser. The quantum dot comb laser can output the laser light (e.g., continuously or in high frequency laser pulses) into a waveguide. A plurality of optical filters can be optically coupled to the waveguide. In various examples, the optical filters can comprise micro-ring resonators (e.g., one micro-ring resonator per laser channel of the quantum dot comb laser), each of which can generate a resonant optical output corresponding to the particular optical characteristics of the micro-ring resonator. An optical combiner can couple the resonant optical outputs from a corresponding pair of optical filters of the plurality of optical filters to output a heterodyned optical signal.

According to examples described herein, the heterodyned optical signals from each pair of optical filters can be outputted through a corresponding waveguide to a photodetector for conversion into an electronic signal. The electronic signals from each photodetector may then be outputted to a linear amplifier to generate the RF tones. It is contemplated that using a single laser source with multiple channels guarantees that the optical outputs from each channel will be in-phase, eliminating the need for high-speed circuitry for phase-locking multiple lasers. However, it is further contemplated that multiple lasers of differing output wavelengths can be utilized (e.g., including phase-locking circuitry). In one aspect, a multi-channel quantum dot comb laser is included to output a single RF tone (e.g., a two-channel comb laser).

One or more examples described provide that methods, techniques, and actions performed by a computing device are performed programmatically, or as a computer-implemented method.

Programmatically, as used herein, means through the use of code or computer-executable instructions. These instructions can be stored in one or more memory resources of the computing device. A programmatically performed step may or may not be automatic.

One or more examples described can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Some examples described can generally require the use of computing devices, including processing and memory resources. For example, one or more examples described may be implemented, in whole or in part, on computing devices such as servers, desktop computers, cellular or smartphones, and tablet devices. Memory, processing, and network resources may all be used in connection with the establishment, use, or performance of any example described herein (including with the performance of any method or with the implementation of any system).

Furthermore, one or more examples described may be implemented through the use of instructions that are executable by one or more processors. These instructions may be carried on a computer-readable medium. Machines shown or described with figures below provide examples of processing resources and computer-readable mediums on which instructions for implementing examples described can be carried and/or executed. In particular, the numerous machines shown with examples described include processor(s) and various forms of memory for storing data and instructions. Examples of computer-readable mediums include permanent memory storage devices, such as hard drives on personal computers or servers. Other examples of computer storage mediums include portable storage units, such as flash memory (e.g., in smartphones, multifunctional devices, or tablets) or magnetic memory. Computers, terminals, network-enabled devices (e.g., mobile devices, such as smartphones) are all examples of machines and devices that utilize processors, memory, and instructions stored on computer-readable mediums. Additionally, examples may be implemented in the form of computer-programs, or a computer usable carrier medium capable of carrying such a program.

Photonic Integrated Circuit

FIG. 1 illustrates an example photonic integrated circuit 100 using a multi-channel quantum dot comb laser 110. As shown in the example of FIG. 1, the quantum dot comb laser 110 can include a plurality of channels (m channels) each outputting laser light of a particular wavelength or color. In certain implementations, the photonic integrated circuit 100 can leverage the advantages of silicon-on-insulator technology, and can comprise a layered substrate (e.g., layered silicon-insulator-silicon) having an insulating material (e.g., silicon dioxide or sapphire) disposed between semi-conductor platforms. In variations, the photonic integrated circuit 100 can comprise a uniform semi-conductor substrate.

In examples described herein, the quantum dot comb laser 110 can be mode-locked, with the spacing between each of the channels being fixed (e.g., at twenty GHz). In other examples, the spacing between each of the channels may be fixed in a range of 10 to 100 GHz. The color of laser light outputted by each channel can be configured by the quantum dot particle sizes within the laser cavity of the quantum dot comb laser 110. For example, the quantum dot comb laser 110 can comprise sixteen channels (e.g., m=16) of sequential spectral colors (e.g., in the visible and/or infrared spectrum), with each color of each channel being defined by a specified particle size of the quantum dots within the laser cavity of that particular channel. Depending on the particle size within each laser channel cavity, the quantum dots of the particular channel comprise an absorption onset and fluorescence properties that produce a specific color of laser light.

The laser output 112 from the multi-channel quantum dot laser 110 can be propagated through a waveguide 115. A number of optical filters 120 can be optically coupled to the waveguide 115 to receive the laser output 112, or a portion of the laser output 112. The number of optical filters 120 may correspond to the number of channels of quantum dot comb laser 110. In other examples, the number of optical filters 120 may differ from the number of channels. For example, there may be a greater number of optical filters 120 to provide redundancy (e.g., in the event of faulty optical filters or heaters for tuning the optical filters as described in more detail below). In various examples, the optical filters 120 can comprise micro-ring resonators (e.g., shown in FIG. 1 as MRR-1 through MRR-m), each having designated resonant characteristics, such as a particular radius, resonant wavelength, and index of refraction. Each optical filter 120 can produce a resonant optical output 122, which can be transmitted via a waveguide to an optical combiner 125. In certain examples, the optical combiner 125 can comprise a typical 50/50 combiner, or can include additional componentry (e.g., at least one optical amplifier) to comprise a lossless combiner.

As shown in FIG. 1, the photonic integrated circuit 100 can comprise a plurality of optical combiners 125, each of which can combine the resonant optical output 122 of two or more optical filters 120. For example, each optical combiner 125 can combine the resonant optical output 122 of a corresponding pair of sequential or adjacent optical filters 120, as shown in FIG. 1. In such an example, the number of optical combiners 125 can comprise one-half the number of optical filters 120.

In variations, the optical combiners 125 can combine the resonant optical output 122 of any pair of optical filters 120. For example, referring to FIG. 1, the resonant optical output 122 of MRR-m may be combined with the resonant optical output 122 of MRR-n, which need not be sequential or adjacent to MRR-m. In a further example, the resonant optical output 122 of MRR-m may be combined, in a designated optical combiner 125, with the resonant optical output 122 of MRR-1. In still further examples, an optical combiner 125 may combine the resonant optical output 122 of more than two optical filters 120 (not shown), or any two optical filters shown in FIG. 1.

According to examples described herein, each optical combiner 125 can combine the resonant optical output 122 from two or more optical filters 120 to produce a heterodyned optical signal 127, which can be transmitted via a waveguide to a photodetector 130. Accordingly, the photonic integrated circuit 100 can comprise a plurality of photodetectors 130, each receiving a heterodyned optical signal 127 from a corresponding optical combiner 125. The heterodyned optical signal 127 from each optical combiner 125 can comprise a designated frequency based on the resonant characteristics of the optical filters 120 from which the resonant optical signals 122 were combined.

In certain implementations, a tuning heater 140 may be coupled to each optical filter 120, or to a subset of the optical filters 120 (e.g., every second or other optical filter). The tuning heater 140 can be configured to alter a temperature of the optical filter 120, thereby changing the resonant characteristics of the optical filter 120. Alteration of the resonant characteristics of the optical filter 120 can cause the designated frequency of the heterodyned optical signal 127 to be changed accordingly. According to examples provided herein, the tuning heater 140 can be coupled to a power source and processing resources (not shown in FIG. 1), which can tune the resonant characteristics of at least one of the optical filters 120 in order to, for example, stabilize the resonant wavelength or produce a desired frequency for the heterodyned optical signal 127. In this manner, the radio frequency tones generated by the photonic integrated circuit 100 can be programmatically or selectively tuned as desired using tuning heaters 140 coupled to the optical filters 120.

In various examples, one or more of the optical filters 120 can each be optically tapped with a secondary waveguide and coupled to a monitoring photodetector 145, which can receive a fractional portion 143 of the resonant optical output 122 of the optical filter 120. In certain aspects, the monitoring photodetector 145 can output an electronic signal to processing resources. As such, the electronic signal from the monitoring photodetector 145 can indicate the resonant wavelength of the optical filter 120, which can change naturally due to, for example, changing ambient temperatures. The processing resources can utilize the electronic signal from the monitoring photodetectors 145 to, for example, adjust the tuning heaters 140 in order to adjust or stabilize the resonant wavelength of the optical filter 120. In some examples, such actions can be performed as part of a closed-loop circuit (e.g., a processing resource may instruct heaters 140 to automatically adjust or stabilize the resonant wavelength of the optical filters 120 in response to the electronic signals from the monitoring photodetectors 145 based on instructions stored in a memory resource) as described in more detail below with respect to FIG. 2.

The photodetectors 130 and monitoring photodetectors 145 can comprise any suitable photodetectors (e.g., avalanche photodiodes), and can convert received optical signals into electronic signals accordingly. For example, each photodetector 130 can convert the heterodyned optical signal 127 into a corresponding electronic signal 132 having a frequency that corresponds to the frequency of the heterodyned optical signal 127, which itself is based on the difference in resonant wavelength of the pair of optical filters 120 from which the heterodyned optical signal 127 is produced. The electronic signals 132 may then be transmitted to a linear amplifier 135, which can amplify the electronic signals 132 to generate a radio frequency tone 195 accordingly. For example, the linear amplifier 135 can generate corresponding radio frequency tones in the GHz or THz range.

Tunable Radio-Frequency Source

Figure 2:
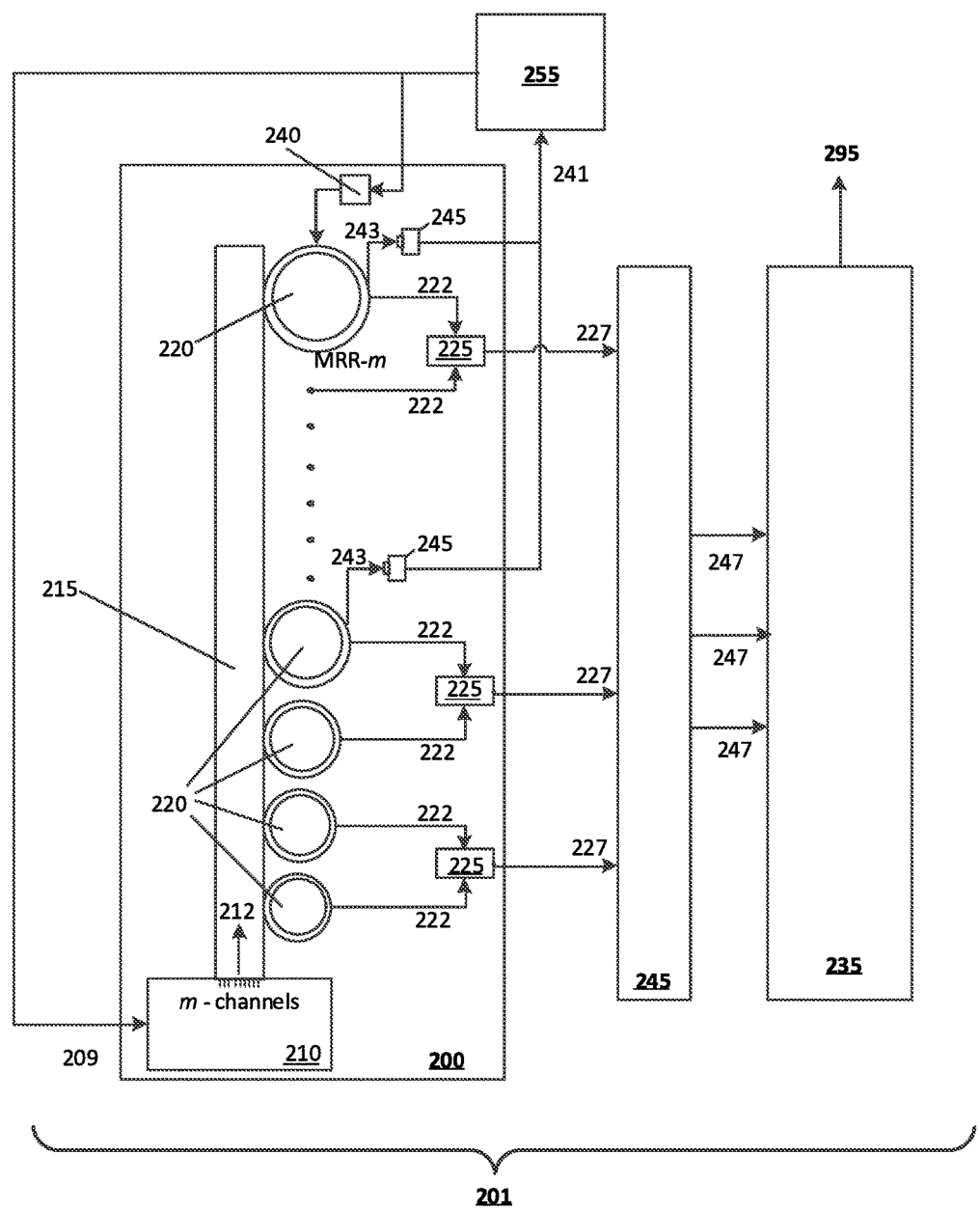
FIG. 2 illustrates an example tunable radio frequency source employing an example photonic integrated circuit, according to examples described herein.

FIG. 2 illustrates an example tunable radio frequency source 201 employing an example photonic integrated circuit 200, according to examples described herein. The tunable radio frequency source 201 can comprise an example photonic integrated circuit 200, such as the photonic integrated circuit 100 described with respect to FIG. 1, and can include an m-channel, quantum dot comb laser 210 producing laser output 212 into a main waveguide 215. In certain examples, the quantum dot comb laser 210 can be controlled by processing resources 255, which can power the laser 210 and/or pulse the laser 210 as desired. As previously described, the photonic integrated circuit 200 can comprise a plurality of optical filters 220 optically coupled to the waveguide 215 and receiving a portion of the laser output 212 to generate resonant optical output 222. As further described, the resonant optical output 222 of multiple optical filters 220 (e.g., two or more) can be combined by an optical combiner 225 to produce a heterodyned optical signal 227 from each optical combiner 225.

According to various examples, the heterodyned optical signal 227 from each optical combiner 225 can be transmitted to a photodetector module 245. In the example shown in FIG. 2, the photodetector module 245 can be off-chip from the photonic integrated circuit 200, and can comprise an array of photodiodes (e.g., avalanche photodiodes), or an integrated detection module, such as a uni-traveling-carrier photodiode (UTC-PD) module. In variations, the photodetector module 245 can be integrated as a component of the photonic integrated circuit 200. In various aspects, the photodetector module 245 can be configured for high-speed optical detection and high-frequency output.

As described herein, the photodetector module 245 can output electronic signals 247 based on the heterodyned optical signals 227. The electronic signals 247 can have designated frequencies corresponding to the combined resonant characteristics of the optical filters 220 and the resultant heterodyned optical signals 227 produced, and can be received by a linear amplifier 235. In various examples, the linear amplifier 235 can amplify the electronic signals 247 to generate desired RF tones 295.

In certain implementations, the resonant characteristics of the optical filters 220 can be monitored, adjusted, and or stabilized by processing resources 255. For example, each optical filter 220 can be optically tapped with a secondary waveguide, through which a fractional portion 243 of the resonant optical output 222 may be transmitted. The secondary waveguide can couple the fractional output 243 of the optical filter 220 to a monitoring photodetector 245, which can convert the fractional output 243 into an electronic monitor signal 241. The monitor signal 241 from each monitoring photodetector 245 can be transmitted to the processing resources 255.

Each optical filter 220 can also be coupled to a tuning heater 240 operable by the processing resources 255. As described herein, the tuning heater 240 can alter a temperature of the optical filter 220, thereby adjusting its resonant characteristics and the wavelength of the resonant optical output 222 accordingly. In various examples, the processing resources 255 can monitor the electronic monitor signal 241 from each optical filter 220 and adjust the tuning heater 240 for the optical filter 220 accordingly.

For example, the processing resources 255 can adjust the tuning heater 240 to maintain or stabilize the resonant wavelength of the optical filter 220 based on changing ambient temperatures and conditions. Additionally or alternatively, the processing resources 255 can adjust the tuning heater 240 to change the resonant wavelength of the optical filter 220, thereby altering the wavelength of the resonant optical output 222, the frequency of the heterodyned optical signal 227, and ultimately the frequency of the generated RF tone 295 outputted by the amplifier 235. Thus, if a particular RF tone 295 is desired, the processing resources 255 can selectively tune one or more of the optical filters 220 and/or the amplifier 235 to produce the desired RF tone 295 accordingly.

The processing resources 255 can comprise one or more processors executing instructions or one or more application specific integrated circuits (ASICs). In some aspects, the processing resources 255 can operate the quantum dot comb laser 210 (e.g., selectively pulse the laser 210 at a given frequency). Additionally or alternatively, the processing resources 255 can monitor the electronic monitor signals 241 from the monitoring photodetectors 245 of the optical filters 220, and adjust the tunable heaters 240 coupled to the optical filters 220 accordingly. In certain variations, the processing resources 255 can monitor the RF tone 295 from the linear amplifier 235 and in response, adjust the tunable heaters 240 to cause a desired RF tone to be generated.

Methodology

Figure 3:
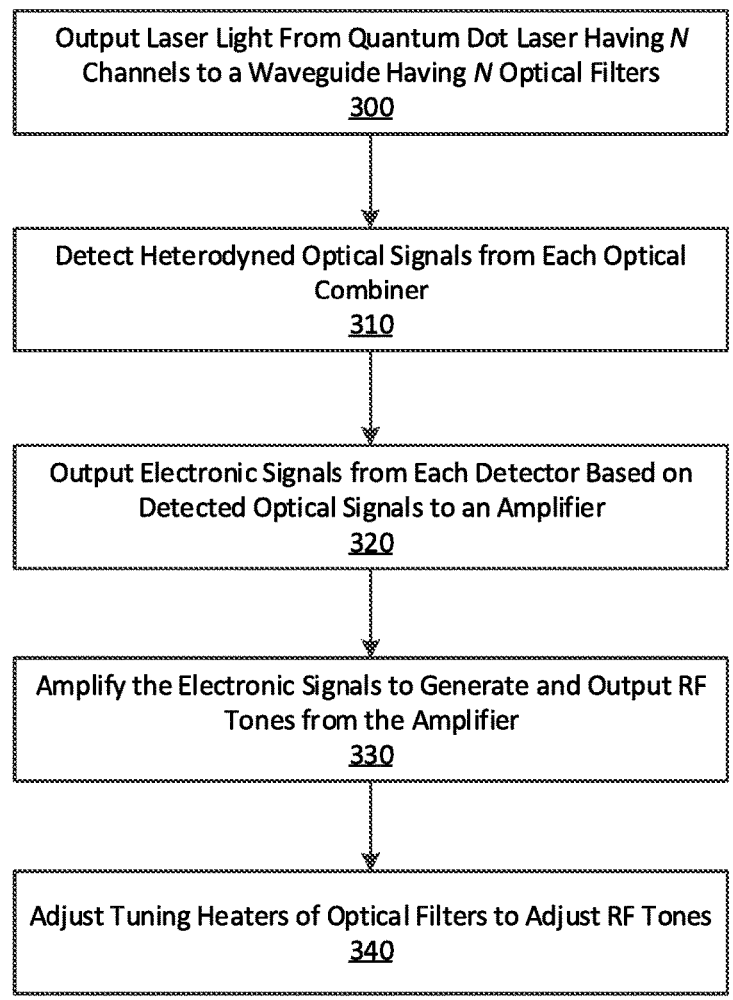
FIG. 3 is a flow chart describing an example method of outputting RF tones based on optical signals, according to examples described herein.
Figure 4:
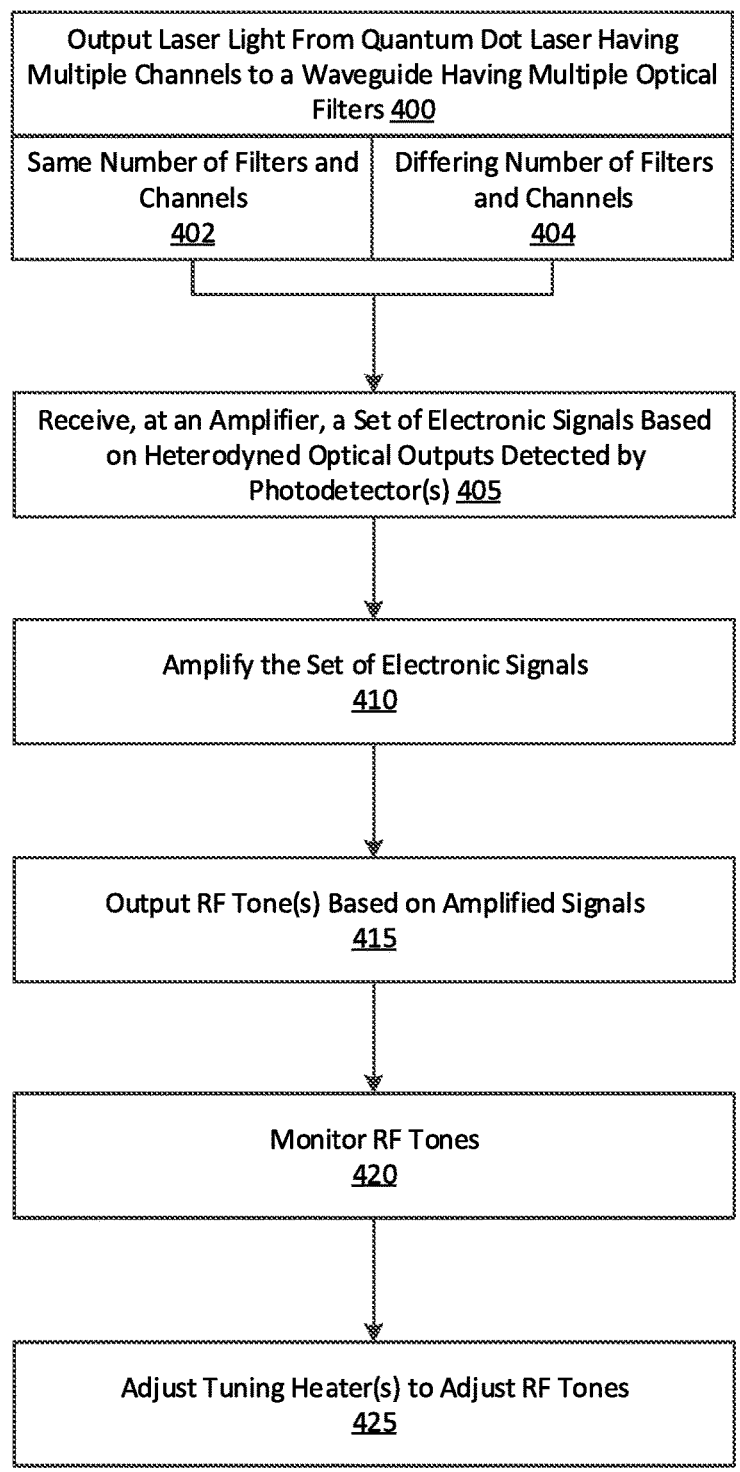
FIG. 4 is another flow chart describing an example method of outputting RF tones based on optical signals, according to examples described herein.
Figure 5:
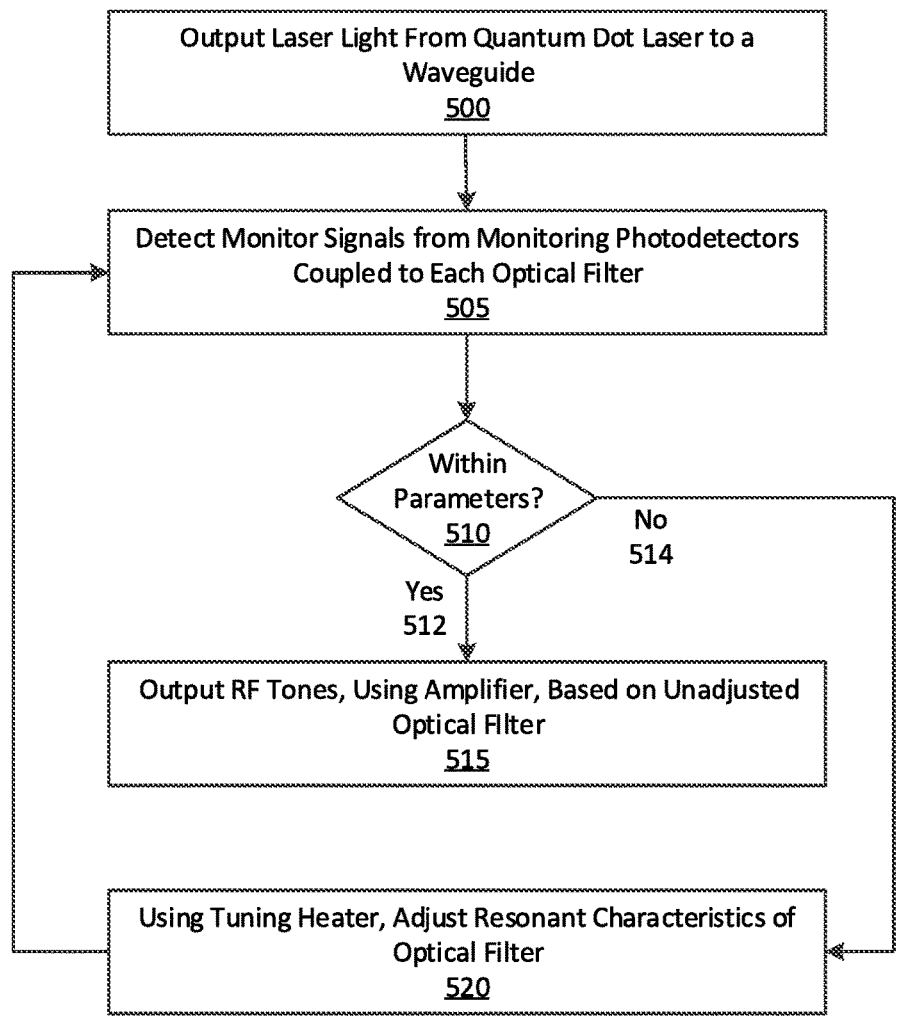
FIG. 5 is a flow chart describing an example method of adjusting resonant characteristics of optical filters, according to examples described herein.

FIGS. 3 through 5 are flow chart describing example methods of generating and outputting RF tones based on optical signals, according to examples described herein. In the below description of FIGS. 3 through 5, reference may be made to reference characters representing like features as shown and described with respect to FIGS. 1 and 2. Furthermore, the methods described with respect to FIGS. 3 through 5 may be performed by one or multiple components as shown and described with respect to FIGS. 1 and 2. For example, the methods may be performed by the processing resources 255 in combination with the photodetector module 245 and linear amplifier 235 as shown in FIG. 2. Still further, the steps described below with respect to FIGS. 3 through 5 need not be performed in any particular order and steps from each respective flow chart may be combined or included with steps from other flow charts.

Referring to FIG. 3, the processing resources 255 can cause a quantum dot comb laser 210 having multiple channels to output laser light 212 to a waveguide 215 having multiple optical filters 220 coupled thereto (300). As described, the optical filters 220 produce resonant optical outputs 222, which can be combined by optical combiners 225 to produce heterodyned optical signals 227. According to various examples, a photodetector module 245 can detect the heterodyned optical signals 227 from each of the optical combiners 225 (310). The photodetector module 245 may then transmit or otherwise output electronic signals 247 corresponding to the heterodyned optical signals 227 to an amplifier 235 (320). The amplifier 235 can amplify the electronic signals 247 to generate and output a desired RF tone 295 (330). In certain aspects, the processing resources 255 can adjust the tuning heaters 240 coupled to the optical filters 220 based on, for example, the RF tone 295 from the amplifier 235 or electronic monitoring signals 241 from monitoring photodetectors 245 tapped to the optical filters 220 (340).

Referring to FIG. 4, the processing resources 255 can trigger a quantum dot comb laser 210 having multiple channels to output laser light 212 into a waveguide 215 (400). In some examples, the quantum dot comb laser 210 may have the same number of channels as the number of optical filters 220 (402). In variations, the quantum dot comb laser 210 may have a differing number of channels as the number of optical filters 220 (404). As described herein, resonant optical output 222 from multiple optical filters 220 may be combined by an optical combiner 225, which can output a heterodyned optical signal 227 to a photodetector (e.g., an avalanche photodiode).

At an amplifier 235, a set of electronic signals 247 may be received, where the electronic signals 247 are based on heterodyned optical outputs 227 from each optical combiner 225, and detected at a respective photodetector (405). The amplifier 235 may then amplify the set of electronic signals 247 accordingly (410), and output a set of RF tones 295 based on the amplified electronic signals (415). In certain implementations, the processing resources 255 can monitor the RF tones 295 generated by the amplifier 235 (420). Based on the RF tones 295, the processing resources 255 can adjust the tuning heaters 240 of one or more optical filters 220 to adjust the RF tones 295 (425).

FIG. 5 is a flow chart describing an example method of adjusting resonant characteristics of optical filters, according to examples described herein. Referring to FIG. 5, the processing resources 255 can output laser light 212 from a quantum dot comb laser 210 into a waveguide 215 (500). The processing resources 255 may detect monitor signals 241 from monitoring photodetectors 245 optically coupled to each optical filter 220 (505). For each optical filter 220, the processing resources 255 can determine whether the resonant characteristics of the optical filter 220 are within a set of predetermined parameters (e.g., a resonant wavelength within a predetermined tolerance range) (510). If so (512), then the processing resources 255 can cause an amplifier 235 to output RF tones 295 based on the unadjusted optical filters 220 (515). However, if not (514), then the processing resources 255 can adjust the resonant characteristics of the optical filter 220 using a tuning heater 240 (e.g., adjust the temperature of the optical filter 220) (520). The processing resources 255 may then continue to detect the monitor signals accordingly (505), as shown in the feedback loop in FIG. 5.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A photonic integrated circuit comprising:
a quantum dot comb laser comprising a plurality of channels;
a waveguide receiving laser output from the plurality of channels of the quantum dot comb laser;
a plurality of optical filters each coupled to the waveguide and outputting resonant optical output; and
a plurality of optical combiners each coupling the resonant optical output from a corresponding pair of optical filters of the plurality of optical filters to output a heterodyned optical signal.

2. The photonic integrated circuit of claim 1, wherein each of the plurality of optical combiners outputs the heterodyned optical signal to a corresponding photodetector.

3. The photonic integrated circuit of claim 2, wherein the corresponding photodetector for each of the plurality of optical combiners is a component of the photonic integrated circuit.

4. The photonic integrated circuit of claim 2, wherein the corresponding photodetector for each of the plurality of optical combiners is off-chip from the photonic integrated circuit.

5. The photonic integrated circuit of claim 2, wherein each corresponding photodetector outputs electronic signals, based on the heterodyned optical signal from each of the plurality of optical combiners, to a linear amplifier.

6. The photonic integrated circuit of claim 1, wherein each optical filter of the plurality of optical filters comprises a micro-ring resonator.

7. The photonic integrated circuit of claim 6, further comprising:
a tuning heater coupled to a corresponding micro-ring resonator of the plurality of optical filters.

8. The photonic integrated circuit of claim 7, wherein each tuning heater configures a temperature of the corresponding micro-ring resonator to adjust a resonance of the corresponding micro-ring resonator.

9. The photonic integrated circuit of claim 1, wherein each of the plurality of combiners comprises one of a 50/50 optical combiner or a lossless optical combiner.

10. The photonic integrated circuit of claim 1, wherein a substrate of the photonic integrated circuit comprises a silicon-on-insulator photonic circuit platform.

11. The photonic integrated circuit of claim 1, further comprising:
a plurality of optical taps each coupled to a corresponding one of the plurality of optical filters; and
a plurality of monitoring photodetectors each coupled to one of the plurality of optical taps.

12. The photonic integrated circuit of claim 11, wherein each of the plurality of optical taps comprises a secondary waveguide receiving a portion of the resonant optical output from a corresponding optical filter.

13. A tunable radio frequency source comprising:
a photonic integrated circuit comprising:
a substrate;
a quantum dot comb laser comprising a plurality of channels;
a waveguide coupled to the substrate, the waveguide receiving laser output from the plurality of channels of the quantum dot comb laser;
a plurality of optical filters each coupled to the waveguide and outputting resonant optical output; and
a plurality of optical combiners each coupling the resonant optical output from a corresponding pair of optical filters of the plurality of optical filters to output a heterodyned optical signal; and
a plurality of photodetectors, off-chip from the photonic integrated circuit, each of the plurality of photodetectors receiving the heterodyned optical signal from a corresponding one of the plurality of optical combiners.

14. The radio frequency source of claim 13, wherein the plurality of photodetectors comprises a uni-traveling-carrier photodiode (UTC-PD) module.

15. The radio frequency source of claim 13, further comprising:
at least one amplifier receiving electronic signals from the plurality of photodetectors, based on the heterodyned optical signal from each of the plurality of optical combiners, and outputting radio frequency signals.

16. The radio frequency source of claim 13, wherein each of the plurality of combiners comprises one of a 50/50 optical combiner or a lossless optical combiner.

17. The radio frequency source of claim 13, wherein the substrate comprises a silicon-on-insulator photonic circuit platform.

18. The radio frequency source of claim 13, the photonic integrated circuit further comprising:
 a plurality of optical taps each coupled to a corresponding one of the plurality of optical filters; and
 a plurality of monitoring photodetectors each coupled to one of the plurality of optical taps.

19. The radio frequency source of claim 18, wherein each of the plurality of optical taps comprises a secondary waveguide receiving a portion of the resonant optical output from a corresponding optical filter.

20. A computer-implemented method of generating radio frequency tone, the method being performed by one or more processors and comprising:
 output, using a multi-channel quantum dot comb laser, laser light into a waveguide, the waveguide being optically coupled to a plurality of optical filters;
 detect, using a photodetector module, a plurality of heterodyned optical signals from a set of optical combiners, each optical combiner in the set of optical combiners combining resonant optical output from a corresponding pair of optical filters from the plurality of optical filters;
 transmit electronic signals, based on the plurality of heterodyned optical signals, from the photodetector module to an amplifier; and
 output, using the amplifier, at least one radio frequency tone based on the electronic signals from the photodetector module.

* * * * *